United States Patent [19]

Ohno et al.

[11] Patent Number: 5,128,781
[45] Date of Patent: Jul. 7, 1992

[54] TRANSMISSIVE LIQUID DISPLAY APPARATUS HAVING A THIN CONSTRUCTION WITHOUT DIMINISHED BRIGHTNESS

[75] Inventors: Jiro Ohno; Tamio Saito, both of Tokyo, Japan

[73] Assignee: Nippon Steel Corporation, Tokyo, Japan

[21] Appl. No.: 585,781

[22] Filed: Sep. 20, 1990

[30] Foreign Application Priority Data

Sep. 21, 1989 [JP] Japan .................. 1-245576

[51] Int. Cl.$^5$ .................. G02F 1/13; F21V 7/04
[52] U.S. Cl. .................. 359/48; 359/49; 359/62; 359/69; 359/70; 362/26; 362/31
[58] Field of Search .............. 350/334, 339 R, 339 D, 350/345; 359/48, 49, 62, 69, 70, 83; 362/26, 31, 84, 311

[56] References Cited

U.S. PATENT DOCUMENTS

| 4,196,581 | 4/1980 | Nemoto | 350/345 |
| 4,229,783 | 10/1980 | Eberhardt | 350/345 |
| 4,285,029 | 8/1981 | McCoy | 350/345 |
| 4,560,264 | 12/1985 | Kitazawa et al. | 359/69 |
| 4,659,183 | 4/1987 | Suzawa | 350/339 D |
| 4,714,983 | 12/1987 | Lang | 350/345 |
| 4,799,771 | 1/1989 | Taniguchi | 350/345 |
| 4,826,294 | 5/1989 | Imoto | 350/345 |
| 4,909,604 | 3/1990 | Kobayashi et al. | 350/345 |
| 4,914,553 | 4/1990 | Hamada et al. | 350/345 |
| 4,933,814 | 6/1990 | Sanai | 350/345 |
| 4,998,804 | 3/1991 | Horiuchi | 350/339 D |
| 5,046,826 | 9/1991 | Iwamoto et al. | 362/31 |

FOREIGN PATENT DOCUMENTS

| 54-143094 | 11/1979 | Japan | 350/345 |
| 57-13478 | 1/1982 | Japan | 350/345 |
| 59-155829 | 9/1984 | Japan | 350/345 |
| 62-102226 | 5/1987 | Japan | 350/345 |
| 63-175830 | 7/1988 | Japan | 359/48 |
| 1-50020 | 2/1989 | Japan | 350/345 |
| 1277817 | 11/1989 | Japan | 350/345 |

Primary Examiner—Andrew J. James
Assistant Examiner—Minhloan Tran
Attorney, Agent, or Firm—Cushman, Darby & Cushman

[57] ABSTRACT

A liquid crystal display apparatus comprising a liquid crystal display panel, plate-like light introducing means disposed behind the liquid crystal display panel, at least one light source receiving portion formed in the intermediate portion of the light introducing means, a light source disposed in the light source receiving portion, light diffusing means disposed between the light source and the liquid crystal display panel in front of at least the light source receiving portion, and light reflecting means disposed behind the light source.

10 Claims, 2 Drawing Sheets

TRANSMISSIVE LIQUID DISPLAY APPARATUS HAVING A THIN CONSTRUCTION WITHOUT DIMINISHED BRIGHTNESS

BACKGROUND OF THE INVENTION

This invention relates to a liquid crystal display apparatus using a liquid crystal display panel, more particularly, to a liquid crystal display apparatus including back light structure.

Liquid crystal display apparatus are used for displays of various kinds of electronic devices such as lap-top computers, word processors and televisions because liquid crystal display apparatus contribute to the miniaturization and low electric consumption of electronic device. Liquid crystal display apparatus are generally divided into two types. One is reflection type equipped with no light source. The other is back light type equipped with light source. The present invention relates to the latter.

Regarding the back light type of liquid crystal display, there are the behind illumination type as shown in FIG. 2 and the side illumination type as shown in FIG. 3. In the behind illumination type as shown in FIG. 2, light sources 4 each comprising a bar-like light emitter such as a cold cathode fluorescent tube (CCFT() are disposed behind a liquid crystal display panel 1. A diffusion plate 2 is disposed between the light sources 4 and the liquid crystal display panel 1. The liquid crystal display panel 1 is uniformly illuminated by the light diffused by the diffusion plate 2. In this behind i illumination type of liquid crystal display apparatus, although the luminance of the liquid crystal display panel 1 is good, it is hard to decrease the thickness of display apparatus. An example of this type is disclosed in JP-A-57-13478 (1982).

In the side illumination type as shown in FIG. 3, light sources 4 such as CCFTs are located at both sides of a liquid crystal display panel 1. The light from each light source 4 is introduced in the lateral direction by a light introduction plate 3 made of glass or transparent synthetic resin. The liquid crystal display panel 1 is illuminated by the light diffused by the light introduction plate 3. This side illumination type has the drawback that the luminance of the liquid crystal display panel 1 is low. The luminance of this type of apparatus is nearly half that of the behind illumination type described above. In the side illumination type, however, the thickness of display apparatus can be decreased by more than 30% in comparison with the behind illumination type. For this reason, this side illumination type is employed in notebook computers given attention in recent years. An example of this type is disclosed in JP-A-1-277817 (1987).

SUMMARY OF THE INVENTION

Accordingly, it is an object of the present invention to provide a liquid crystal display apparatus in which the luminance of the liquid crystal display panel is high while the thickness of the display apparatus if minimal.

It is another object of the present invention to provide a liquid crystal display apparatus which ha low power consumption.

The above and other objects are attained by a liquid crystal display apparatus comprising a liquid crystal display panel, plate-like light introducing means disposed behind the liquid crystal display panel, at least one light source receiving portion formed in the intermediate portion of the light introducing means, a light source disposed in the light source receiving portion, light diffusing means disposed between the light source and the liquid crystal display panel in front of at least the light source receiving portion, and light reflecting means disposed behind the light source.

The above and other objects and many of the attendant advantages of this invention will be readily appreciated as the same becomes better understood by reference to the following detailed description when considered in connection with the accompanying drawing.

DETAILED DESCRIPTION OF THE PREFERRED EMBODIMENT

Figure 1:
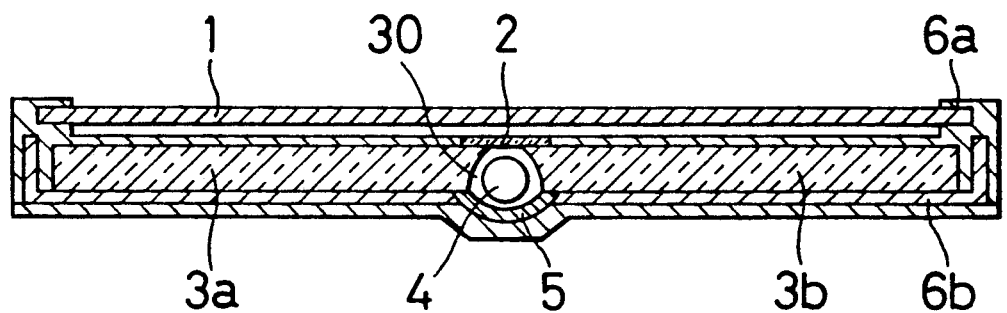
FIG. 1 is a cross sectional view of a liquid crystal display apparatus of the present invention.
Figure 2:
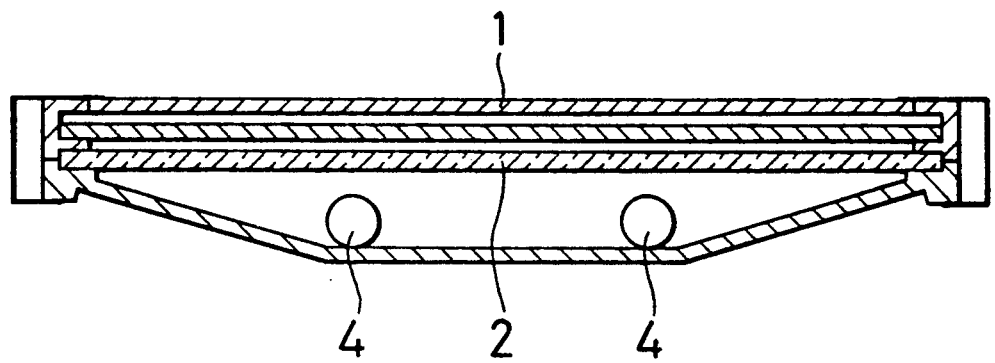
FIG. 2 is a cross sectional view of a prior art liquid crystal display apparatus.
Figure 3:
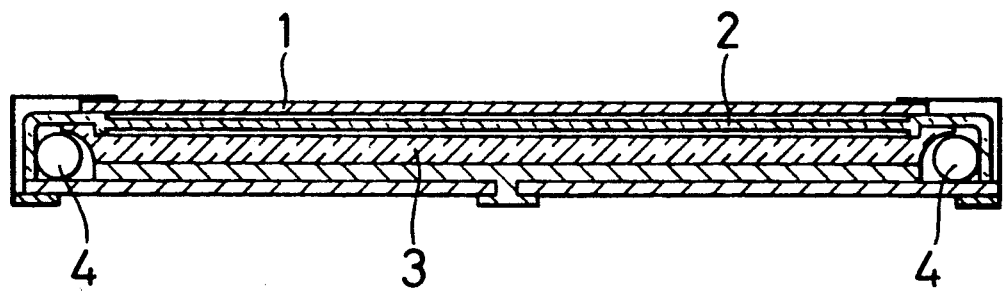
FIG. 3 is a cross sectional view of another prior art liquid crystal display apparatus.

Referring to FIG. 1, a liquid crystal display apparatus has upper and lower chassis 6a and 6b, respectively, both made of synthetic resin. A liquid crystal display panel (LCD panel) 1 is mounted to the upper chassis 6a. At least part of the upper chassis 6a opposite to the LCD panel 1 is transparent.

A pair of light introduction plates 3a and 3b is attached to the upper chassis 6a behind the LCD panel 1. The light introduction plates 3a and 3b define a gap 30 which extends along the center line of the LCD panel 1 perpendicularly to the plane of the drawing. A bar-like light source 4 comprising a cold cathode lamp such as CCFT is disposed in the gap 30. The end wall of each of the light introduction plates 3a and 3b facing the light source 4 is curved in accordance with the profile of the cold cathode lamp of the light source 4 as clearly shown in the drawing.

A diffusion plate 2 is mounted to the upper chassis 6a to cover the gap 30. The diffusion plate 2 prevents the LCD panel from being illuminated directly by the light source 4. By the provision of the diffusion plate 2, variance of the luminance between the central portion of the LCD panel 1 and both side portions of the LCD panel 1 which are illuminated by the light through the light introduction plates 3a and 3b is provided.

A reflection plate 5 is disposed behind the light source 4. By the provision of the reflection plate 5, the light from the light source 4 is utilized efficiently.

In the liquid crystal display apparatus of this example, although the back surface of the central portion cannot projects to some extent, the rest of the apparatus can be designed in a thin form. As a result, because printed boards or other electronic parts can be disposed behind the thin portion, a thin electronic device can be attained.

In the example described above, the light introducing means comprises a pair of the light introduction plates 3a and 3b and the light source receiving portion is formed by the gap 30 defined by the light introduction plates 3a and 3b. The light introducing means way, however, comprise one light introduction plate in which a recess or a hole is formed in its central portion as the light source receiving portion. The light source is not limited to a bar shape like the example described above. A spherical light source may be disposed at the center of the light introducing means. In any case, it is preferred that the light source receiving portion has a shape in accordance with the profile of the light source. The number of the light source receiving portion is also not limited to one like the example described above. Plural light source receiving portions may be formed in the light introducing means. A light source is disposed in each light source receiving portion. In that case, it is preferred that the light source receiving portions be distributed in the light introducing means as uniformly as possible. In the case of using a U-shaped lamp as the light source, it should be disposed symmetrically with respect to the center line of the light introducing means.

Experimental results

A lap-top computer was constructed using a liquid crystal display apparatus which includes one bar-like light emitter as shown in FIG. 1. For comparison, a lap-top computer using a liquid crystal display apparatus of well-known side illumination type which includes two bar-like light emitters were used. The experimental results are shown in the following table 1.

TABLE 1

|  | Example | comparative example |
| --- | --- | --- |
| Average luminance (nit) | 50.0 | 50.0 |
| Thickness of display apparatus (mm) | 15.0 (17.0)* | 14.0 |
| Power consumption (W) | 2.2 | 4.5 |
| Weight of display apparatus (g) | 750.0 | 950.0 |

*thickness of the central portion
Conditions:
(1) liquid crystal panel; STN back light type
(2) light source; cold cathode lamp
(3) dimension of display; 240 mm × 180 mm
(4) number of dots; 640 × 480

As shown in table 1, in the prior art display apparatus of the comparative example, the power consumption, the average luminance and the thickness of the display apparatus were 4.5 W, 50 nit (candela/m$^2$) and 14 mm, respectively, contrast to the values of the present invention, which were 2.2 W, 50 nit and 15 mm, respectively. Evidently from these results, in the display apparatus of the present invention, the power consumption can be decreased to about half of that of the prior art display apparatus while the luminance and the thickness are kept nearly equal to those of the prior art display apparatus. As a result, the life of a battery of the electronic device can be elongated by about 20% without further change of specifications. Furthermore, these results means that the luminance of liquid crystal display panel in the present invention can be increased in comparison with the prior art display apparatus if the power consumption of the two is equal.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

We claim:

1. A transmissive liquid crystal display device comprising:
   a liquid crystal display panel;
   a light diffusion plate disposed behind said liquid crystal display panel;
   a light source disposed behind said light diffusion plate;
   a light reflection plate disposed behind said light source;
   first light introducing means disposed behind said liquid crystal display panel on one side of said light source, for introducing light from said light source to the first direction along said liquid crystal display panel; and
   second light introducing means disposed behind said liquid crystal display panel on a side of said light source so as to extend in the direction opposite of said first light introducing means, for introducing light from said light source to the second direction along said liquid crystal display panel.

2. A transmissive liquid crystal display device according to claim 1, wherein opposing inner walls of said first and second light introducing means define a light source receiving portion for receiving said light source.

3. A transmissive liquid crystal display device according to claim 1, wherein said light source is disposed along a central line of said liquid crystal display panel.

4. A transmissive liquid crystal display device according to claim 1, wherein said light source includes a cold cathode lamp.

5. A transmissive liquid crystal display device according to claim 1, wherein both said first and second light introducing means are able to sufficiently introduce light from said light source to an end portion of said liquid crystal display panel.

6. A transmissive liquid crystal display device comprising:
   a liquid crystal display panel;
   at least one light source which is disposed behind said liquid crystal display panel;
   plate-like light introducing means disposed behind said liquid crystal display panel, the thickness of said light introducing means being substantially the same of that of said light source;
   a light source receiving portion formed in said light introducing means for receiving said light source therein, said light introducing means comprising an annular wall or at least two separate wall portions opposite to each other for defining said light source receiving portion as a space through the thickness of said light introducing means;
   light diffusing means disposed between said liquid crystal display panel and said light source so as to cover said light source receiving portion of said light introducing means; and
   light reflecting means disposed behind said light source.

7. A transmissive liquid crystal display device according to claim 6, wherein said light introducing means includes a pair of light introduction plates which define a gap therebetween as said light source receiving portion, said gap extending along a central line of said light introducing means.

8. A transmissive liquid crystal display device according to claim 6, wherein said light source includes a cold cathode lamp.

9. A transmissive liquid crystal display device according to claim 6, wherein said device further comprises:
   a first chassis for mounting said liquid crystal display panel and provided with a transparent wall portion at a rear position of said liquid crystal display panel, said light diffusing means being built in said transparent wall portion at a position corresponding to said light source receiving portion of said light introducing means; and a second chassis for fixing said light introducing means by cooperating with said transparent wall portion of said first chassis.

10. A transmissive liquid crystal display device according to claim 9, wherein said light reflecting means is built in a rear wall of said second chassis at the position corresponding to said light source receiving portion of said light introducing means.

* * * * *